United States Patent [19]
Kuwabara et al.

[11] Patent Number: 5,952,767
[45] Date of Patent: Sep. 14, 1999

[54] INDEX-TYPE COLOR CATHODE RAY TUBE

[75] Inventors: Yuji Kuwabara; Toru Takahashi, both of Fukaya, Japan; Eiji Kamohara, Horseheads, N.Y.

[73] Assignee: Kabushiki Kaisha Toshiba, Kawasaki, Japan

[21] Appl. No.: 08/861,225

[22] Filed: May 21, 1997

[30] Foreign Application Priority Data

May 21, 1996 [JP] Japan ................................. 8-125443

[51] Int. Cl.$^6$ ....................................................... H01J 31/00
[52] U.S. Cl. ............................................. 313/2.1; 313/471
[58] Field of Search ........................... 313/2.1, 461, 470, 313/473, 471, 477 R, 111, 112; 315/9, 10; 348/383, 813

[56] References Cited

U.S. PATENT DOCUMENTS

| | | | |
|---|---|---|---|
| 3,564,121 | 2/1971 | Goodman | 358/69 |
| 4,804,845 | 2/1989 | Takeuchi | 250/367 |
| 5,418,426 | 5/1995 | Rilly | 315/9 |

FOREIGN PATENT DOCUMENTS 62-216238  9/1987  Japan .

*Primary Examiner*—Sandra O'Shea
*Assistant Examiner*—Michael J. Smith
*Attorney, Agent, or Firm*—Pillsbury Madison & Sutro LLP

[57] ABSTRACT

First and second index signal phosphor layers are formed on a phosphor screen that is formed on the inner surface of a face plate. A rear plate is provided with first and second light sensing units for detecting signal lights from the first and second index signal phosphor layers, respectively. Each first light sensing unit includes a first light collecting plate, which radiates absorbing light having a radiation peak wavelength substantially equal to or shorter than the radiation wavelength of each first index signal phosphor layer. Each second light sensing unit includes a second light collecting plate, which radiates absorbing light having a radiation peak wavelength substantially equal to or shorter than the radiation wavelength of each second index signal phosphor layer. Arranged between each second collecting plate and the rear plate is a filter, which transmits the index signal light from the second index signal phosphor layer and shades the index signal light from the first index signal phosphor layer.

5 Claims, 4 Drawing Sheets

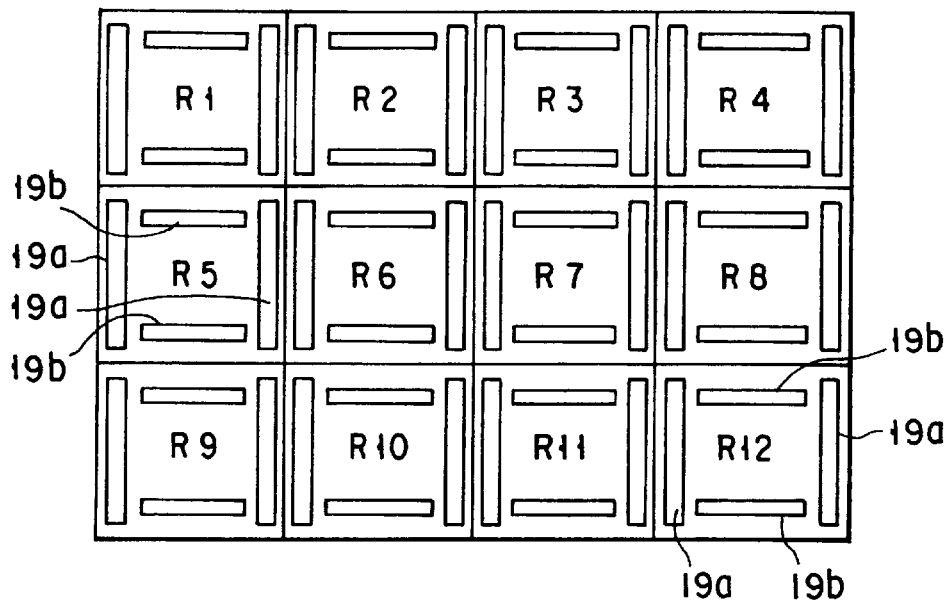
F I G. 5
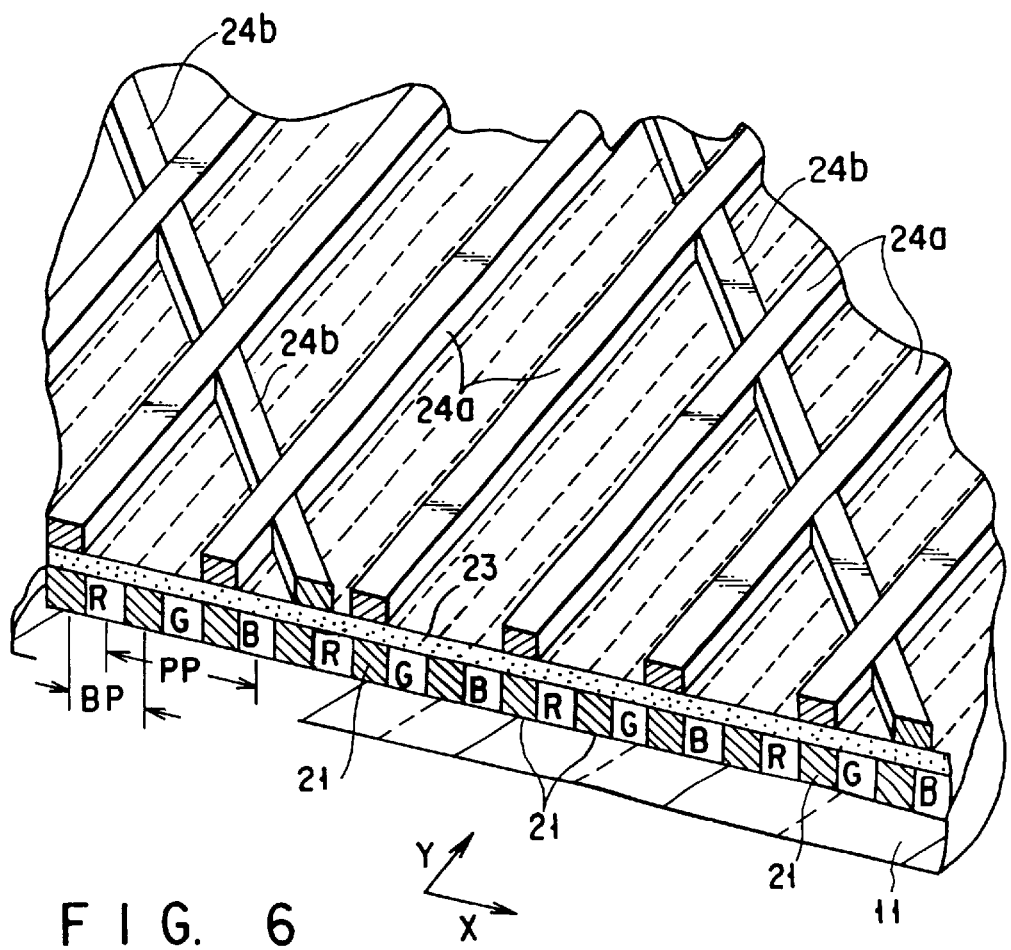
F I G. 6

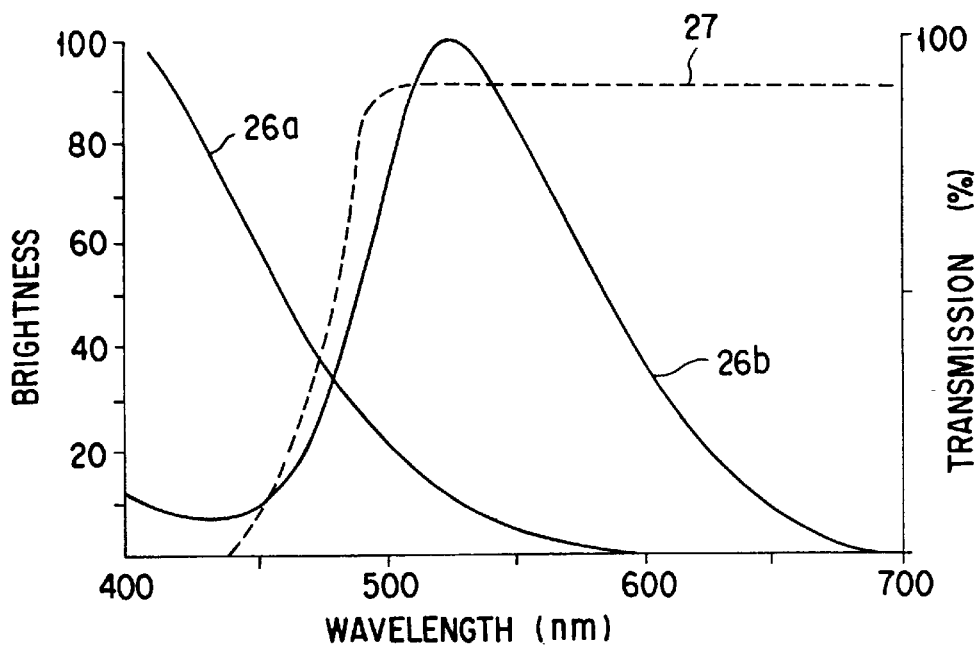
F I G. 7
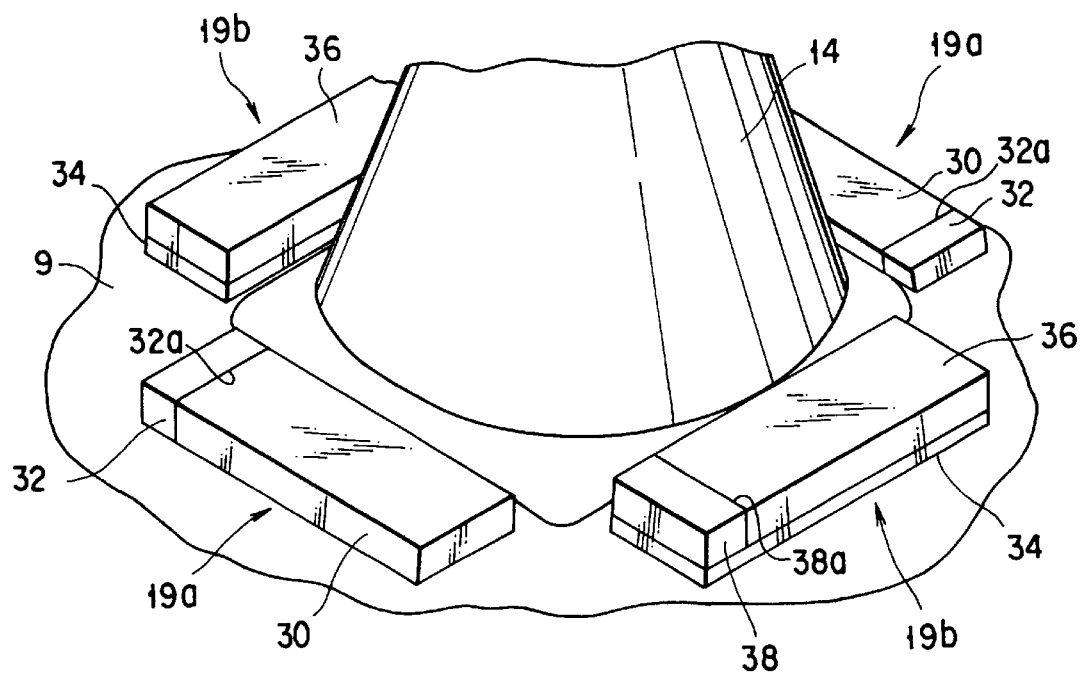
F I G. 8

INDEX-TYPE COLOR CATHODE RAY TUBE

BACKGROUND OF THE INVENTION

The present invention relates to an index-type color cathode ray tube, in which a phosphor screen, which has a plurality of regions, is dividedly scanned with electron beams that are emitted from a plurality of electron guns.

In general, color cathode ray tubes that are practically used in a wide variety of fields are of the shadow-mask type. In these cathode ray tubes, electron beams incident on a phosphor screen, which is composed of dot- or stripe-shaped phosphor layers that radiate in three different colors, blue, green, and red, are sorted by means of a shadow mask that is opposed to the screen. In the cathode ray tubes of this type, however, the electron beam transmission of the shadow mask is as low as about 20%, so that the radiation efficiency of the phosphor, compared to the energy of all electron beams emitted from the electron guns, is too low to ensure a high luminance of the tubes. Further, the shadow mask is heated to be deformed by the electron beams that run against it, so that the color purity is lowered.

Conventionally, index-type color cathode ray tubes are known as ones that are free from the aforesaid drawbacks of the shadow-mask type. In the index-type color cathode ray tubes, a phosphor screen is provided with phosphor layers for generating index signals, as well as stripe-shaped phosphor layers of three colors for image display. Scanning positions for electron beams are detected for color change by using light sensing units to detect index signal lights obtained from the index signal phosphor layers by electron beam scanning.

These index-type color cathode ray tubes can dispense with a shadow mask and enjoy a high luminance. In the cathode ray tubes of this type, however, the spot diameters of the electron beams with which the phosphor screen are scanned are expected to be not larger than the stripe width of the phosphor layers of each color throughout the phosphor screen area.

The larger the size of a color cathode ray tube, in general, the longer the distance from each electron gun to the phosphor screen is, and the higher the electrooptical magnification of each electron gun is. In the case of a large-sized tube, in particular, therefore, it is difficult to reduce the spot diameters of the electron beams throughout the phosphor screen area.

In order to detect the scanning positions for electron beams continually, moreover, the phosphor screen must be scanned with electron beams that have energy such that index signal lights with a given intensity can be obtained from the index signal phosphor layers. Thus, the brightness of the black level of a picture is settled depending on the lowest level of the electron beam energy. The larger the size of the cathode ray tube, on the other hand, the longer the distance from the phosphor screen to each light sensing unit is. Correspondingly, the index signal lights that reach the light sensing units are feebler, so that the detection of the lights is more difficult. If the energy of the electron beams with which the phosphor screen is scanned is enhanced, the black level of the picture becomes brighter, resulting in a whitened picture of low quality.

As means for solving these problems, an index-type color cathode ray tube is described in Jpn. Pat. Appln. KOKOKU Publication No. 4-53067. In this cathode ray tube, an integral phosphor screen has a plurality of regions, and these regions are dividedly scanned with electron beams that are emitted from a plurality of electron guns. Images generated individually on the screen regions are joined together into one synthetic image to be displayed. Even though this index-type cathode ray tube is large-sized, the distance from the phosphor screen to each light sensing unit can be shortened. Accordingly, the black level of the picture can be prevented from being lowered, and the resulting tube can enjoy a high luminance, high contrast, and large size.

In order to improve the scanning and color change characteristics, some index-type cathode ray tubes are designed so that index signal phosphor layers of two types are formed on the phosphor screen. These phosphor layers include first and second index signal phosphor layers. Each first index signal phosphor layer is formed over a black stripe situated between each two of stripe-shaped phosphor layers of three colors, with a metal backing of aluminum interposed between the layers. Each second index signal phosphor layer is formed extending at a given angle to the color phosphor layers with the aluminum backing between the layers.

Described in Jpn. Pat. Appln. KOKAI Publication No. 57-65651 is photoelectric converter means for general index signal lights. According to this converter means, the index signal lights are subjected to wavelength conversion by means of transparent flat plates (light collecting plates) doped with a phosphor, and are guided to solid light sensing units.

In order to discriminate the index signal lights of two types having different radiation wavelengths, according to known detecting means, a filter is disposed in front of (or on the phosphor-screen side of) each light collecting plate so that only lights of a given wavelength can be guided to the collecting plate, whereby the index signal lights are detected.

In discriminating the index signal lights with different radiation wavelengths by means of filters, however, long-wavelength index signal lights can be identified relatively easily by using a filter that has a predetermined transmission characteristic. Although short-wavelength index signal lights can be also discriminated by means of a filter with a predetermined transmission, it is difficult to manufacture the filter of this type, actually. This filter on the short-wavelength side, if manufacturable, is more expensive than the one on the long-wavelength side. Actually, a substantial difference in transmission cannot be secured between long- and short-wavelength regions of the short-wavelength filter. If the transmission of the long-wavelength region is lowered in order to shade the long-wavelength index signal lights without restraint, therefore, that of the short-wavelength region lowers correspondingly, so that the sensitivity for the detection of the index signal lights inevitably worsens. If the transmission of the short-wavelength region is increased, on the other hand, that of the long-wavelength region also increases, so that the long-wavelength index signal lights are introduced. Thus, it is difficult to change the electron beams.

According to the index-type cathode ray tube in which the integral phosphor screen has a plurality of regions which are dividedly scanned, moreover, an additional component is needed to detect the index signal light for each region, so that the number of necessary components, and therefore, manufacturing costs increase.

In the index-type cathode ray tube constructed in this manner, the filters of the two types are used to discriminate the index signal lights of the two types. In this case, it is difficult to avoid the introduction of the long-wavelength index signal lights so that only the short-wavelength index signal lights can be discriminated, and satisfactory images cannot be obtained. Also, there are problems including the necessity of use of a plurality of expensive filters, high costs, etc.

BRIEF SUMMARY OF THE INVENTION

The present invention has been contrived in consideration of these circumstances, and its object is to provide a low-priced index-type color cathode ray tube capable of displaying satisfactory images without using any expensive filters for short-wavelength lights, in order to discriminate index signal lights of two types having different radiation wavelengths.

In order to achieve the above object, according to the present invention, there is provided an index-type color cathode ray tube, which comprises: an envelope including a substantially flat face plate; a phosphor screen including phosphor layers of three different colors and formed on the inner surface of the face plate; a plurality of electron guns arranged in the envelope, for emitting electron beams toward the phosphor screen so that a plurality of regions of the phosphor screen are dividedly scanned with the electron beams; first and second index signal phosphor layers arranged on the phosphor screen, for radiating first and second index signal lights as the phosphor screen is scanned with the electron beams, the second index signal phosphor layer having a radiation peak wavelength longer than that of the first index signal phosphor layer; and first and second light sensing units arranged on the envelope, for detecting the first and second index signal lights, respectively.

The first light sensing unit includes a first light collecting plate, for radiating light on receiving light having a radiation peak wavelength substantially shorter than the radiation wavelength of the first light collecting plate, and a light receiving section for receiving the light radiated from the first light collecting plate.

The second light sensing unit includes a filter for shading light having a radiation peak wavelength substantially shorter than the radiation wavelength of the second index signal light from the second index signal phosphor layer, a second light collecting plate for radiating light on receiving light having a radiation peak wavelength shorter than the radiation wavelength of the second light collecting plate, and a light receiving section for receiving the light from the second light collecting plate.

In general, a light collecting plate is extremely low in its radiation efficiency with respect to light having a wavelength substantially equal to the radiation wavelength of the light collecting plate, and transmits almost index light radiated from a signal phosphor layer and having a radiation peak wavelength substantially equal to the radiation wavelength of the light collecting plate.

In contrast, according to the color cathode ray tube of the present invention, the light collecting plate of the first light sensing unit radiates light when it receives the index light from the first index signal phosphor layer, and transmits the index signal light from the second index signal phosphor layer. Accordingly, the first light sensing unit can detect the signal light from the first index signal phosphor layer without using any special filter. In the second light sensing unit, on the other hand, the filter shades the signal light from the first index signal phosphor layer so that only the signal light from the second index signal phosphor layer can be absorbed for radiation, and the light receiving section can detect the signal light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 8 show an index-type color cathode ray tube according to an embodiment of the present invention, in which:

FIG. 1 is a perspective view showing the front side of the color cathode ray tube;

FIG. 2 is a perspective view showing the rear side of the color cathode ray tube;

FIG. 3 is a sectional view taken along line III—III of FIG. 1;

FIG. 4 is a sectional view taken along line IV—IV of FIG. 1;

FIG. 5 is a plan view showing first and second light sensing units arranged on the back of the color cathode ray tube;

FIG. 6 is a perspective view showing a phosphor screen and index signal phosphor layers of the color cathode ray tube;

FIG. 7 shows characteristic curves representing relations between the radiation wavelengths of the index signal phosphor layers of the color cathode ray tube and filter transmission; and FIG. 8 is a perspective view showing the first and second light sensing units.

DETAILED DESCRIPTION OF THE INVENTION

An index-type color cathode ray tube according to an embodiment of the present invention will now be described in detail with reference to the accompanying drawings.

Figure 1:
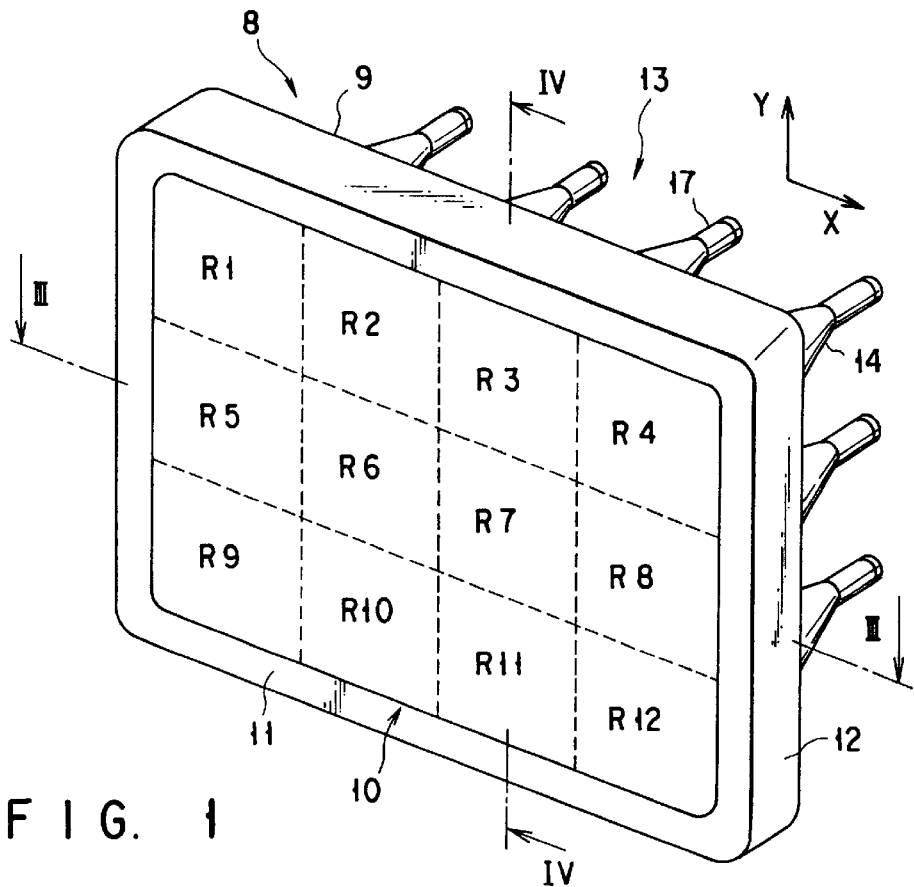
Figure 2:
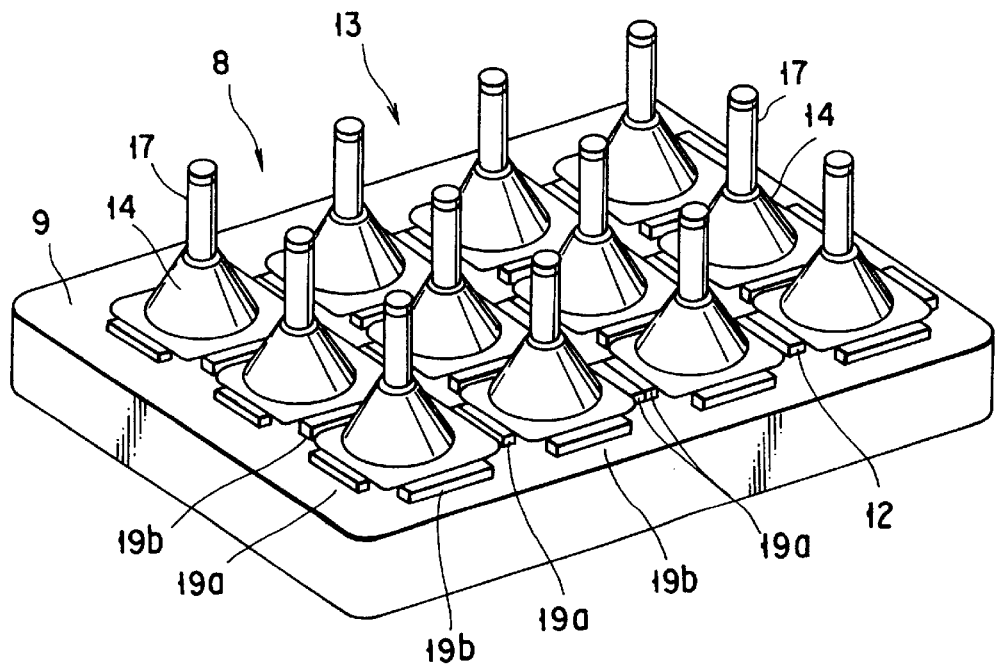

As shown in FIGS. 1 and 2, the color cathode ray tube comprises a vacuum envelope 8, which includes a face plate 11 having a substantially rectangular flat effective portion 10 and a skirt portion 12 on the periphery of the effective portion 10, a rear plate 9 bonded to the skirt portion 12 and opposed to the face plate in parallel relation, and a funnel section 13 continuous with the rear plate. The funnel section 13 includes twelve funnels 14 arranged in a matrix, four in each row in the horizontal direction (X-axis direction) and three in each column in the vertical direction (Y-axis direction).

Figure 3:
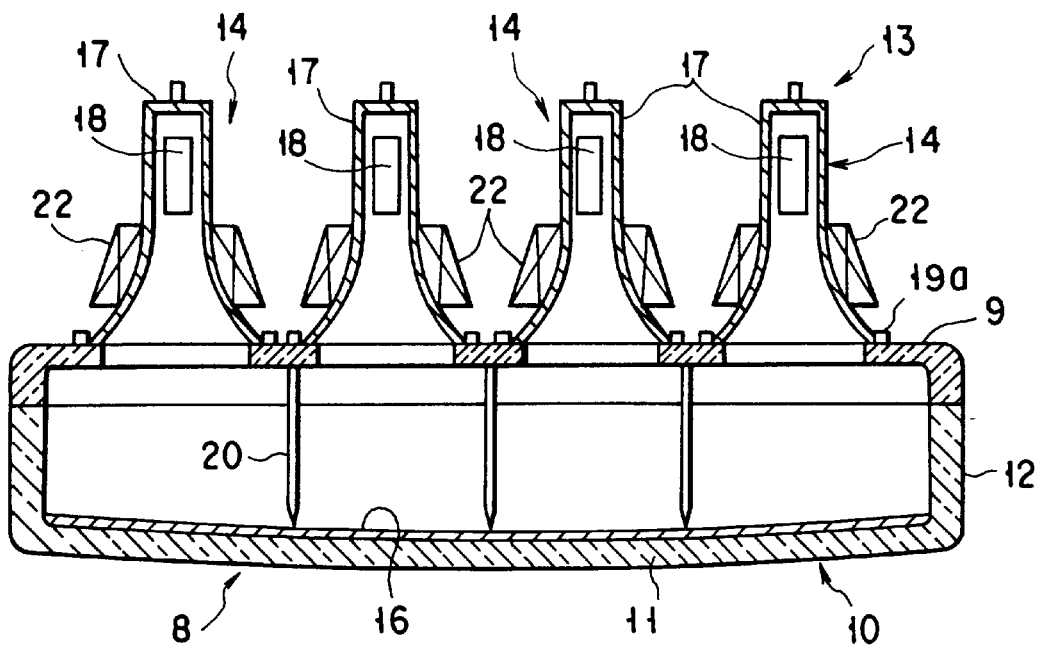
Figure 4:
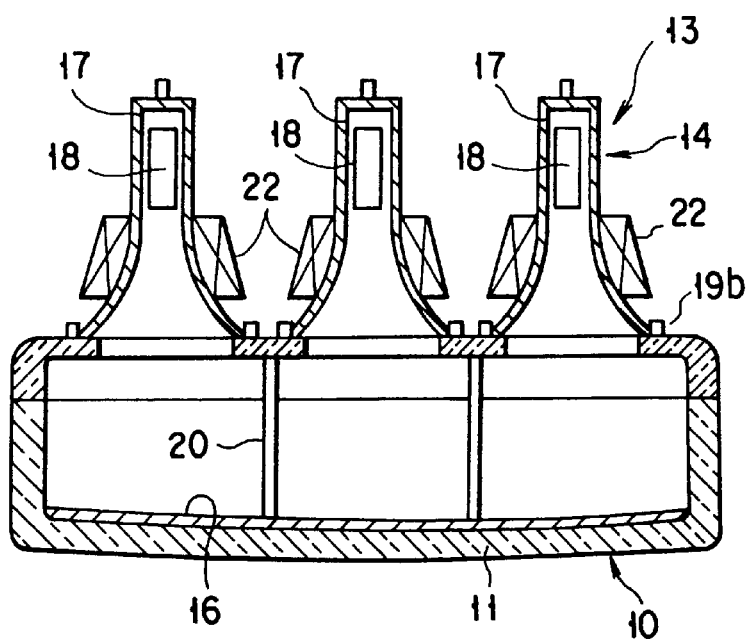

As shown in FIGS. 3 and 4, a phosphor screen 16 (mentioned later) is formed on the inner surface of the effective portion 10 of the face plate 11. A plurality of electron guns 18 for emitting single electron beams toward the screen 16 are arranged in a neck 17 of each funnel 14. Mounted on the outer periphery of each funnel 14 is a deflector 22 for deflecting each electron beam emitted from its corresponding electron gun 18 in the horizontal and vertical directions. Arranged inside the vacuum envelope 8 are a plurality of rod-shaped support members 20 for supporting the atmospheric load that acts on the flat and rear face plates 11 and 9. One end of each support member 20 is in contact with the rear plate 9, while the other end abuts against a shading layer (mentioned later) of the phosphor screen 16 that is formed on the inner surface of the face plate 11.

As shown in FIGS. 2 to 5, on the other hand, the rear plate 9 is provided with a pair of light receiving windows (not shown) that are arranged individually on the opposite sides of each funnel 14 in the horizontal and vertical directions. Arranged outside these windows are first and second pairs of light sensing units 19a and 19b for selectively detecting index signal lights, which will be mentioned later.

In the color cathode ray tube constructed in this manner, the single electron beams emitted from the electron guns 18, twelve in number for the case illustrated, are deflected horizontally and vertically by means of magnetic fields that are generated by the deflectors 22 mounted on the funnels 14, individually. The phosphor screen 16 has twelve regions R1 to R12 arranged in a matrix, four in each row in the horizontal direction and three in each column in the vertical direction, and these regions are dividedly scanned with the electron beams. Images generated individually on the regions are joined together into one synthetic image to be displayed.

In the phosphor screen 16, as shown in FIG. 6, elongate stripe-shaped phosphor layers B, G and R of three different colors are arranged side by side in a plurality of rows at predetermined pitches in the horizontal direction, and stripe-shaped light absorbing layers (black stripes) 21 extend vertically between the phosphor layers B, G and R. A deposited aluminum film 23 is provided at the back of the phosphor layers B, G and R and the light absorbing layers 21, and first and second index signal phosphor layers 24a and 24b, which radiate light with different peak wavelengths, are arranged on the film 23.

The first index signal phosphor layers 24a, out of the index signal phosphor layers 24a and 24b of the two different types, are formed of a phosphor that radiates with a peak wavelength on a relatively short side, as indicated by a curve 26a in FIG. 7, and are arranged in the form of stripes on the deposited aluminum film 23, overlying their corresponding light absorbing layers 21. The arrangement pitch of the first layers 24a is twice the arrangement pitch (BP) of the light absorbing layers 21, that is, ⅔ times the arrangement pitch (PP) of the phosphor layers B, G and R.

On the other hand, the second index signal phosphor layers 24b are formed of a phosphor that radiates light with a peak wavelength on a relatively long side, as indicated by a curve 26b in FIG. 7, and are arranged in the form of stripes on the deposited aluminum film 23, extending across the first index signal phosphor layers 24a, that is, declining to the right at an angle of about 25° to the horizontal axis for the case illustrated. The arrangement pitch of the second layers 24b is eight times the pitch BP of the light absorbing layers 21.

The first light sensing units 19a, out of the first and second light sensing units 19a and 19b, serve to detect the index signal lights from the first index signal phosphor layers 24a. As shown in FIG. 8, each first light sensing unit 19a includes a rectangular light collecting plate (first light collecting plate) 30, which is opposed to its corresponding window and fixed to the rear plate 9, and a light receiving section 32, such as a photodiode, having a light receiving surface 32a opposed to one end face of the plate 30 in the longitudinal direction thereof.

In contrast with this, the second light sensing units 19b serve to detect the index signal lights from the second index signal phosphor layers 24b. Each second light sensing unit 19b includes a rectangular light collecting plate (second light collecting plate) 36, which is opposed to its corresponding window and fixed to the rear plate 9 through a filter 34, and a light receiving section 38, such as a photodiode, having a light receiving surface 38a opposed to one end face of the plate 36 in the longitudinal direction thereof. As indicated by a transmission curve 27 in FIG. 7, the filters 34 efficiently transmit the index signal lights from the second index signal phosphor layers 24b, and effectively shade the index signal lights from the first index signal phosphor layers 24a.

The following is a description of further preferred examples of the first and second light sensing units 19a and 19b. An acrylic sheet, e.g., Acrylite produced by Mitsubishi Rayon Co., Ltd., is used as a base material for the light collecting plates 30 and 36, the first index signal phosphor layers 24a are formed of a P47 phosphor that radiates light with a peak wavelength of 400 nm, and the second index signal phosphor layers 24b are formed of a P46 phosphor that radiates with a peak wavelength of 530 nm. In this case, a green fluorescent acrylic sheet is used as the light collecting plate 30 of each first light sensing unit 19a, while a red fluorescent acrylic sheet is used as the light collecting plate 36 of each second light sensing unit 19b. In this case, moreover, the filter 34, which is formed of, for example, a lemon-yellow acrylic sheet or cellophane, is located in front of the light collecting plate 36 of each second sensing unit 19b.

With use of the first and second light sensing units 19a and 19b constructed in this manner, the index signal lights from the first and second index signal phosphor layers 24a and 24b of the two types, which radiate lights with different peak wavelengths, can be securely discriminated. Thus, an index-type color cathode ray tube that can display satisfactory images can be constructed including the low-priced light sensing units 19a and 19b, without using any expensive filters that are conventionally needed to discriminate the index signal lights on the short-wavelength side.

Fluorescent dyes with which the light collecting plates are doped radiate brilliantly when they are excited by lights with wavelengths shorter than their own radiation wavelengths, but are not hardly excited by lights with wavelengths equal to or longer than their radiation wavelengths. In other words, each light collecting plate 30 radiates absorbing lights with wavelengths shorter than its radiation wavelength, and transmits lights with wavelengths longer than its radiation wavelength. Each first collecting plate 30 is formed with its radiation wavelength which is longer than the radiation peak wavelength of the first index signal phosphor layers 24a and is substantially equal to or shorter than the radiation peak wavelength of the second index signal phosphor layers. Thus, if the green fluorescent acrylic sheet, which is doped with a green fluorescent dye, is used as the light collecting plate 30 of each first light sensing unit 19a, which detects the index signal light from each first index signal phosphor layer 24a formed of the P47 phosphor that radiates light with the peak wavelength of 400 nm, the plate 30 cannot be excited by the index signal light from each second index signal phosphor layer 24b formed of the P46 phosphor that radiates light with the peak wavelength longer than the radiation wavelength of the plate 30. Accordingly, the light collecting plate 30 is excited to radiation by only the index signal light from its corresponding first index signal phosphor layer 24a, and can selectively discriminate and guide the index signal light from the first layer 24a on the short-wavelength side to the corresponding light receiving section 32.

In each second light sensing unit 19b for detecting the index signal light from each corresponding second index signal phosphor layer 24b formed of the P46 phosphor that radiates light with the peak wavelength of 530 nm, on the other hand, the light collecting plate 36 is formed of a red acrylic sheet or cellophane that is doped with a red fluorescent dye. The plate 36, like the light collecting plate 30 of each first light sensing unit 19a, radiates light by absorbing lights with wavelengths shorter than its radiation wavelength, and transmits lights with wavelengths longer than its radiation wavelength. Thus, the second light collecting plate 36 is formed with its radiation wavelength which is longer than the radiation peak wavelength of the second index signal phosphor layers 24b. Further, each filter 34, which can effectively shade radiation from the first index signal phosphor layer 24a, is located in front of the light collecting plate 36, that is, on the side of the phosphor screen 16. Accordingly, the index signal light from each first index signal phosphor layer 24a is shaded by the filter 34, and the light collecting plate 36 is excited to radiation by the index signal light from its corresponding second index signal phosphor layer 24b. Thus, the plate 36 can selectively discriminate and guide the index signal light from the second layer 24b on the long-wavelength side to the corresponding light receiving section 38.

With use of the first and second light sensing units 19a and 19b constructed in this manner, the index signal lights from the first index signal phosphor layers 24a on the short-wavelength side can be discriminated without using any expensive filters. Thus, the resulting index-type color cathode ray tube enjoys a low-priced construction such that it can selectively recognize the index signal lights from the first and second index signal phosphor layers 24a and 24b and change colors.

According to the embodiment described herein, the first and second index signal phosphor layers are formed of the P47 and P40 phosphors, respectively. However, these phosphor layers may be formed by combining any other phosphors that radiate lights with distinguishably different peak wavelengths.

The number of the regions of the phosphor screen is not limited to twelve, and may be changed as required.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. An index type color cathode ray tube comprising:

an envelope including a substantially flat face plate;

a phosphor screen including phosphor layers of three different colors and formed on an inner surface of the face plate;

a plurality of electron guns arranged in the envelope, for emitting electron beams toward the phosphor screen so as to dividedly scan a plurality of regions of the phosphor screen;

first and second index signal phosphor layers arranged on the phosphor screen, for radiating first and second index signal lights as the phosphor screen is scanned with the electron beams, the second index signal phosphor layer having a radiation peak wavelength longer than that of the first index signal phosphor layer; and first and second light sensing units arranged on the envelope, for detecting the first and second index signal lights, respectively, the first light sensing unit including a first light collecting plate having its radiation wavelength which is longer than the radiation peak wavelength of the first index signal phosphor layers and is substantially equal to or shorter than the radiation peak wavelength of the second index signal phosphor layers, for radiating light on receiving light having a radiation peak wavelength substantially shorter than the radiation wavelength of the first light collecting plate, and a light receiving section for receiving the light radiated from the first light collecting plate, and the second light sensing unit including a filter for shading light having a radiation peak wavelength substantially shorter than the radiation wavelength of the second index signal light from the second index signal phosphor layer, a second light collecting plate having its radiation wavelength which is longer than the radiation peak wavelength of the second index signal phosphor layers, for radiating light on receiving light having a radiation peak wavelength shorter than the radiation wavelength of the second light collecting plate, and a light receiving section for receiving the light from the second light collecting plate.

2. A color cathode ray tube according to claim 1, wherein each of the first and second light collecting plates is formed of an acrylic sheet doped with a fluorescent dye.

3. A color cathode ray tube according to claim 2, wherein the acrylic sheet is substantially rectangular in shape and has a side face opposed to the phosphor screen and an end face substantially perpendicular to the side face; and each of the respective light receiving sections of the first and second light sensing units has a light receiving surface opposed to an end face of the acrylic sheet.

4. A color cathode ray tube according to claim 3, wherein the filter is provided between the side face of the acrylic sheet and the phosphor screen.

5. A color cathode ray tube according to claim 1, wherein the envelope includes a rear plate facing the face plate in substantially parallel relation and a plurality of funnels fixed to the rear plate and containing the electron guns, individually, and the first and second light sensing units are arranged in pairs around the funnels on the rear plate.

* * * * *